June 19, 1928.

B. W. DENNIS

EXPANSION JOINT OR COUPLING

Original Filed June 16, 1920

1,674,277

Inventor.
Basil W. Dennis.
By Jesse A. Holton.
Attorney.

Patented June 19, 1928.

1,674,277

UNITED STATES PATENT OFFICE.

BASIL W. DENNIS, OF COLUMBUS, OHIO.

EXPANSION JOINT OR COUPLING.

Application filed June 16, 1920, Serial No. 389,338. Renewed December 15, 1924.

This invention relates to expansion joints or couplings, and with regard to certain more specific features thereof to fluid-pressure-controlled joints or couplings.

One of the important objects of the invention is to provide a non-leakable connection between fluid conductors which will accommodate any increase or decrease in their dimensions due to expansion or contraction under varying temperatures.

Another object of the invention lies in the provision of means providing a fluid tight joint between conduit members of a character permitting an exceptionally wide variation in distance between said members without any substantial change in pressure at the joint.

Still another object of the invention is to obtain uniformity of pressure completely around the conduit joint under different relative positions of the conduit members and so as to avoid disalignment of the latter.

Other objects will be in part obvious and in part pointed out particularly hereinafter.

The invention accordingly consists in the various features of construction, combination of elements, and arrangement of parts, which will be exemplified by the construction hereinafter set forth and the scope of the application of which will be indicated by the following claims.

In the drawings, wherein are represented a few of the various possible embodiments of the invention:

Figure 1:
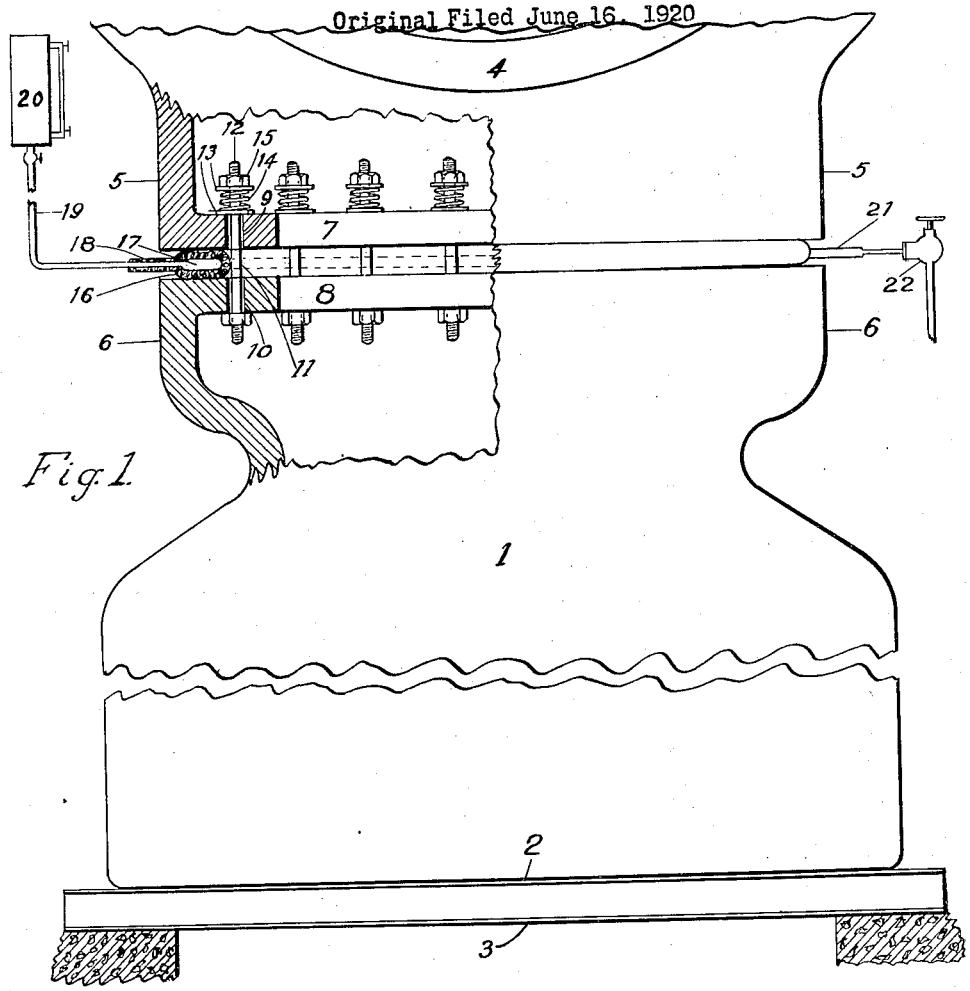
Fig. 1 is a view in elevation and partly in section of a joint or coupling, and shows an adaptation of the invention between a turbine engine and a condenser.

Referring now more particularly to the drawings wherein similar reference characters refer to similar parts throughout the several views, it will be noted that in Fig. 1 a condenser 1 is shown with its base 2 resting on any rigid form of support 3. In juxtaposition with the condenser, a turbine engine 4 is arranged so that a discharge end or nozzle 5 of the turbine is flexibly connectible with a receiving portion 6 of the condenser. Around the peripheries of the turbine nozzle and the condenser receiver are flanges 7 and 8 respectively, equipped with a plurality of bolt holes such as 9 and 10 respectively. These flanges may extend internally or externally as desired, but are here represented as extending inwardly and are separated as will hereinafter appear. Through corresponding bolt holes are passed bolts 11, of suitable diameter and length to permit of slight sidewise movement in the holes and to provide a portion 12 extending beyond a flange. A washer 13, and a spring 14 are placed loosely around each extending portion and these parts are held in position by a nut 15 on each bolt. Lying between and separating the flanges 9 and 10 is a flexible gasket or packing 16, having an internal cavity 17 extending throughout its entire length. A pressure-exerting fluid may be introduced into this cavity through a nipple 18 integral with the gasket. In the embodiment of the invention herein illustrated, the nipple 18 is shown connected by a tube 19 to a pressure maintaining apparatus 20. Another similar nipple 21 is provided, with a control valve 22, to permit drawing off of the fluid, or, if desired, to regulate a constant circulation of the fluid through the gasket.

In certain cases, especially where a partial vacuum exists within the conduit, the inherent resiliency of the gasket together with atmospheric pressure may be depended upon to maintain a tight connection with the flanges.

In practise it has been found that any undue strains placed on the turbine casing are apt to cause interference between it and the revolving wheels, and various means have been provided with the purpose of relieving such strains. Different types of joints have been devised, and supports comprising yielding means have been used. In the embodiment of the invention herein illustrated, the entire condenser is carried by rigid supporting means at its base, thus relieving any strains due to the weight of the condenser and its contents. The turbine is also supported, in a manner not shown, so that its weight need not be considered. This leaves only the strains due to expansion and contraction of the units, and these are compensated for in the following manner. The turbine and condenser are placed in juxtaposition as determined by their calculated spaced relation. The empty gasket is next placed between the flanges. The bolts are then passed through the flanges, and the washers, springs and nuts loosely assembled.

The nuts are turned down until the springs, preferably of calibrated type, exert a pressure opposite to the pre-estimated pressure of the gasket. Fluid is then introduced to the cavity of the gasket until a predetermined pressure therein is obtained. It is to be noted that in this condition the external forces acting on the turbine and condenser are substantially constant. This gasket of the present embodiment of the invention may be of a normal cross-sectional shape corresponding to an oval having its greater dimension in a plane transverse to the axis of the conduits, the size and shape of the gasket being such that, with the conduit separated to the maximum extent attainable in normal operation of, for instance, a steam turbine, there is contact over a substantial surface between the gasket and the end flange of each conduit, with a low positive pressure preferably used within the gasket. Likewise, the characteristics of this gasket are preferably such that when the conduits are in positions of nearest mutual approach, the gasket is not fully flattened or doubled on itself, there being considerable fluid-occupying space within the gasket. In assembling the joint, the gasket, in depressed or contracted condition, rendered so as by the application of mechanical pressure to the exterior of the gasket or by reducing the pressure within the gasket to a suitable degree, is inserted in a transverse direction to operative position between the end flanges of the conduits, and it is then relieved of the contracting influence and permitted to assume normal sealing relation with respect to the end flanges of the conduits, as indicated. As indicated hereinabove, the depressed or contracted condition of the gasket may be its normal one, that is, with the interior of the gasket subjected to atmospheric pressure, in which case the gasket may readily be inserted to operative position as described hereinabove, without distortion, and when in place, the application of normal operating pressure distorts and inflates the gasket to such size as causes establishment of the desired sealing relation with the conduit flanges. Obviously, where the normal size of the gasket is greater than the distance between the opposing conduit flanges, the gasket must be initially depressed or contracted to such size as will permit placing the same in position between the opposing conduit flanges; and after the gasket has been placed in this latter position, it may remain exposed to atmospheric pressure or may be subjected to a higher pressure corresponding to that supplied from the reservoir 20.

As the turbine is started and a vacuum is created in the condenser, more or less fluid may be delivered to the gasket to compensate for any slight give or stretch therein caused by the vacuum. As the units heat up and expand, they move slightly toward one another and subject the gasket to additional compression; while the springs, having but a relatively small movement, continue to exert an approximately constant pressure. The constant pressure apparatus thereupon permits sufficient fluid to escape from the gasket to maintain a pressure therein equivalent to the pressure exerted by the springs. Similarly, as the units cool off and contract, the same constant pressure apparatus will add fluid to the gasket and thus hold its internal pressure constant. It is obvious from the foregoing description that there will be exerted no unbalanced external forces on the turbine casing and necessarily no resultant strains therein to cause it to give so that it will interfere with the blades or revolving wheels.

Figure 2:
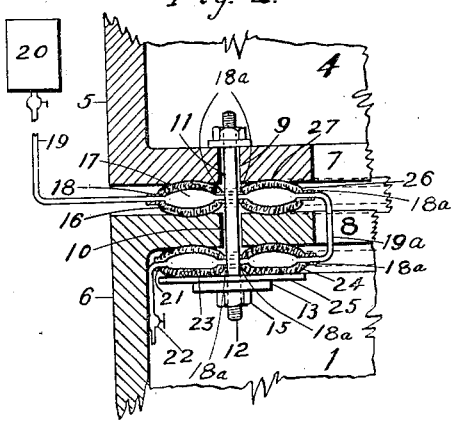
Fig. 2 is a view in section showing one modification of the invention.

In Fig. 2 there is shown a modification of the invention wherein the spring means illustrated in Fig. 1 are replaced by internal fluid-pressure controlled gaskets, 23 and 24. These are placed on the opposite side of the flange from the gasket 16, and a follower plate 25 is added. In order to balance the forces exerted by these two gaskets, a fourth gasket 26 of the same form as the others is placed between the flanges. The four gaskets are connected together by a plurality of nipples 18$^a$ and tubes 19$^a$ similar to those already noted, and by means of the constant pressure maintaining apparatus 20, the system is operative in the same manner as heretofore described. In this illustration the flanges are shown shaped as at 27 to conform to a portion of the gasket exterior. This is only one form of the many grooves or recesses that might be turned in the flange for the purpose of accurately locating the gasket and for assisting in retaining it in position.

Figure 3:
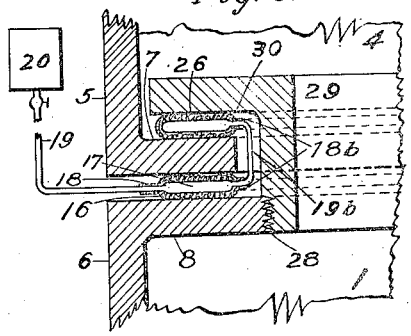
Fig. 3 is a view in section showing another modification of the invention.

In Fig. 3 another modification of the invention is shown, wherein two gaskets 16 and 26, similar to those already described, are placed on opposite sides of the flange, and connected by a plurality of nipples 18$^b$ and tubes 19$^b$. Flange 8 is internally threaded at 28 to accommodate a member 29 provided with a flanged portion 30 adapted to project therefrom in the opposite direction of flange 8, and to form a bearing surface for the gasket 26. In the assembly of this type of joint the two main flanges 7 and 8 are located in proper spaced relation after which the gasket 16 is placed between them and the gasket 26 placed on the opposite side of flange 7; and the flanged inner member 29 is then turned into the threaded opening of flange 8 until its flanged portion 30 is the same distance from one side of flange 7 as flange 8 is from the opposite side. Fluid pressure is then supplied by the constant pressure maintaining apparatus 20 until the desired pressure is established in both gaskets 16 and 26. It is to be noted that in this form of construction the bolts, nuts, washers and springs are dispensed with, and the flanges are blank.

A point to be noted in connection with this invention is that it has special applicability to apparatus in which alignment of parts and the maintaining of relative positions of the parts is an important consideration. As in a steam turbine and condenser, for example, wherein the condenser is supported from a fixed platform and the engine is separately supported. It is desired to provide a tight and constant joint between the condenser and the engine. The problem is created due to expansion and contraction of the material, and the solution amounts to providing means for maintaining substantially the same surface pressure at, and completely around, the joint, whether the parts are spaced a certain distance or whether they are three-eighths of an inch more or less nearer together.

Although the particular embodiments of the invention illustrated herein are shown as connecting a turbine engine and a condenser, it is to be understood that such connections might be placed between any units which are subjected to varying temperatures or require means to compensate for expansion and contraction, and the scope of the invention is not to be limited to one such connection in a system but is to be understood to cover a plurality of such connections where more than one is necessary to best balance the expensive and leakage forces. While features of the present invention have been described hereinabove in connection with the use of devices, such as the heretofore known spring-pressed bolts or equivalent means, for constraining the conduits against, or limiting their degree of misalignment, or for balancing all or a portion of the thrust that may be exerted, through the pressure within the gasket, on the opposed seating portions on the two conduit sections, it is to be understood that the expansion gasket of this invention is readily capable of and adapted for use without the provision of such aligning or thrust-balancing devices.

As many changes could be made in the above construction and as many apparently widely different embodiments of the invention might be made without departing from the scope thereof, it is intended that all matter contained in the foregoing description or shown in the accompanying drawings shall be interpreted as illustrative and not in a limiting sense.

Having described the invention, what I claim and desire to secure by Letters Patent is:

1. In apparatus of the character described, in combination, two independently supported conduit units free to approach and recede from each other longitudinally to a substantial degree, a joint between said conduit units, comprising means for maintaining a fluid tight seal of substantially uniform pressure characteristic against the passage of fluid transversely through said joint, said means including a hollow flexible gasket disposed between the ends of said conduit units.

2. In apparatus of the character described, in combination, two conduits adapted to approach and recede from each other, a flexible hollow gasket arranged between the said conduits, and fluid pressure means for automatically regulating and maintaining substantially constant fluid pressure in the said flexible gasket in spite of movements of approach and separation between said conduits due to varying expansion and contraction of the said conduits.

3. In apparatus of the character described, a pair of conductors independently supported with their conducting passages in alignment, and a flexible hollow gasket interposed between said conductors to seal the joint between them, said gasket being connected with a reservoir of fluid supply constituting a pressure agent for expanding the gasket to seal the joint and having provision for mantaining a substantially constant surface pressure at the joint as the conductors expand or contract varying the distance between said conductors.

4. In apparatus of the character described, a pair of conductors supported with their conducting passages in alignment, means for automatically maintaining a constant pressure seal between said conductors over a wide range of separation and approach between them, comprising a flexible hollow gasket interposed between the conductors and connected with an outside head of fluid.

5. In apparatus of the character described, in combination, two conduits, a flexible hollow gasket arranged between the conduits, and an automatically regulated fluid pressure source adapted to maintain automatically in the said flexible gasket a constant pressure sufficient to maintain the pressure contact of the gasket under varying expansion and contraction of the said conduits.

6. In apparatus of the character described, in combination, a member having a discharge opening, a second member having an opening communicating with the said first opening, connections for restricting the members against separation and disalignment, a flexible hose between the members surrounding said openings, an automatically regulated source of fluid under pressure adapted to maintain automatically in the said flexible hose a constant pressure, a pipe connection between the said source and the flexible hose, and means independent of the said pipe connection permitting the exhaust of fluid from said flexible hose.

7. In apparatus of the character described, in combination, a fluid carrying unit with an open end, a second fluid carrying unit with an open end in alignment with the first, a flexible hose between the ends of the units adapted to seal the joint under pressure, a reservoir and a pipe connecting said reservoir with said hose, said reservoir, pipe and hose adapted to receive and hold fluid so that it will exert pressure from within said hose outwardly against the ends of the units, and said reservoir, pipe and hose being related and having provision whereby the reservoir may take up and hold the exhaust from the hose when the units expand and release fluid to said hose when the members contract.

8. In apparatus of the character described, in combination, two units relatively movable having portions in juxtaposition, fluid pressure means between adjacent sides of said portions adapted to maintain therewith a non-leakable connection, fluid-pressure means on the opposite side of one of said portions retaining means extending through said portions, said last fluid pressure means coacting with said retaining means to yieldingly limit the separation of said units, and means for maintaining pressure in said fluid pressure means.

9. In apparatus of the character described, in combination, two independently movable conduit units free to approach and recede from each other longitudinally to a substantial degree, one of said conduits having an exteriorly recessed portion, a second one of said conduits having an interiorly flanged portion in alinement with the recessed portion of said first conduit, a flexible, resilient hollow rubber gasket, and means for automatically maintaining said gasket in fluid tight sealing relation with said flanged portions against leakage across the same, while permitting substantial relative movement of both approach and separation of said conduits.

10. In apparatus of the character described, in combination, two independently movable conduits free to aproach and recede from each other longitudinally to a substantial degree, a flexible, resilient hollow gasket between said conduits, and means for automatically maintaining within said flexible gasket substantially uniform pressure of a value higher than the pressure within said conduits while permitting free and substantial movement of both approach and separation between said conduits, whereby said gasket is maintained continuously in fluid tight relation with said conduits.

11. The method herein described of inserting an annular joint or coupling having a resilient side wall including a flexible tubular portion between relatively fixed members of a fluid conductor, which consists in placing the coupling between opposed seat portions of said fixed members while said coupling is of an axial length to permit such placement, and causing flexure of the walls of said tubular portion when in inserted position to increase the length of the coupling and maintain the latter in fluid tight sealing engagement with the seat portions of said fixed members of the fluid conductor.

12. In combination, a pair of spaced and substantially alined fluid conductors anchored in position and having similar seating portions, and means for providing a fluid tight seal for the space between said conductors, said means comprising an annular element including a tubular portion having yielding side walls, and means for applying pressure to said tubular portion to cause parts of the surface thereof to engage the seating portions of said fluid conductors in a fluid tight manner.

13. In combination, two longitudinally alined conduits adapted to approach and recede from each other to accommodate for varying expansion and contraction thereof, and means for maintaining a seal against the passage of fluid transversely through the space between said conduits comprising a hollow flexible gasket arranged between said conduits, and means for automatically maintaining a substantially uniform pressure within said gasket in spite of movement of approach and separation of said conduits.

14. In combination, two independently movable conduit portions in substantial alinement and free to approach and recede from each other to a substantial degree, a flexible hollow gasket disposed between the opposed ends of said conduit portions and held in fluid tight sealing engagement therewith, and means comprising an axially extending flange-like portion carried by one of said conduit portions for maintaining said gasket in operative position.

15. In apparatus of the character described, in combination, two independently supported conduit units free to approach and recede from each other longitudinally to a substantial degree, a joint between said conduit units, comprising means for maintaining a fluid tight seal of substantially uniform pressure characteristic against the passage of fluid transversely through said joint, said means including a hollow flexible gasket disposed between the ends of said conduit units, and resilient means for resisting thrust exerted by said gasket tending to separate said conduit units.

BASIL W. DENNIS.